Figure 1:
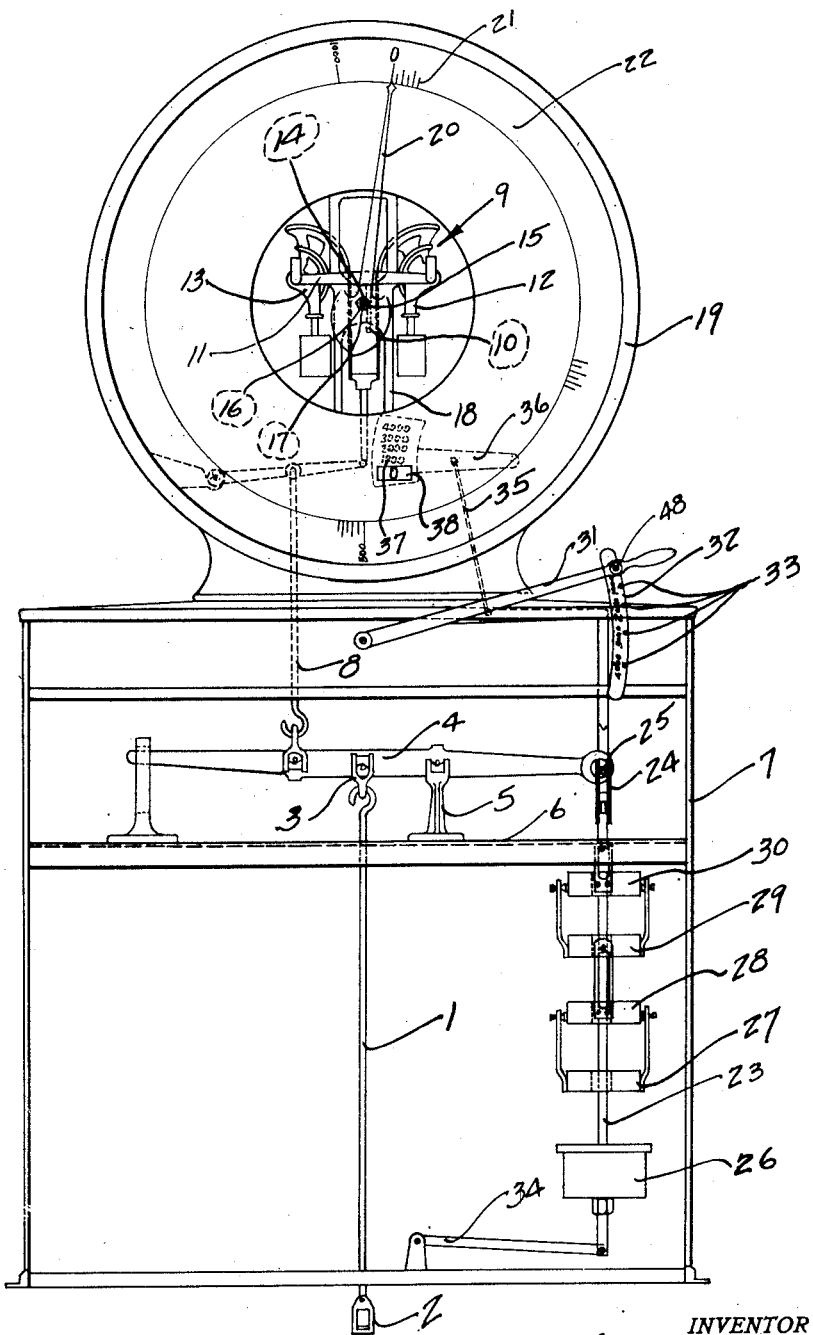

June 28, 1932. L. S. WILLIAMS 1,864,570
TOTAL LOAD RECORDING SCALE
Filed April 22, 1930  5 Sheets-Sheet 1

INVENTOR
Lawrence S. Williams
BY
CO Marshall
ATTORNEY

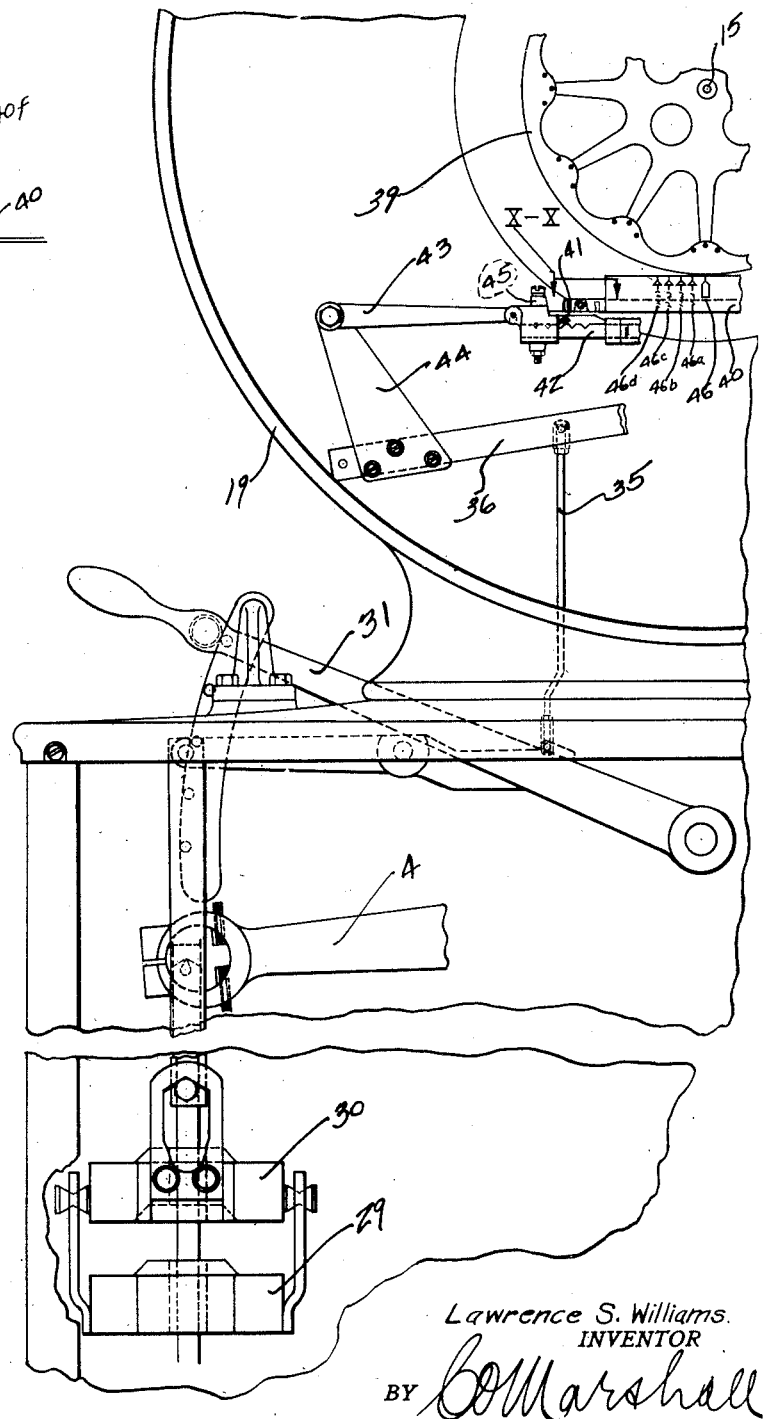

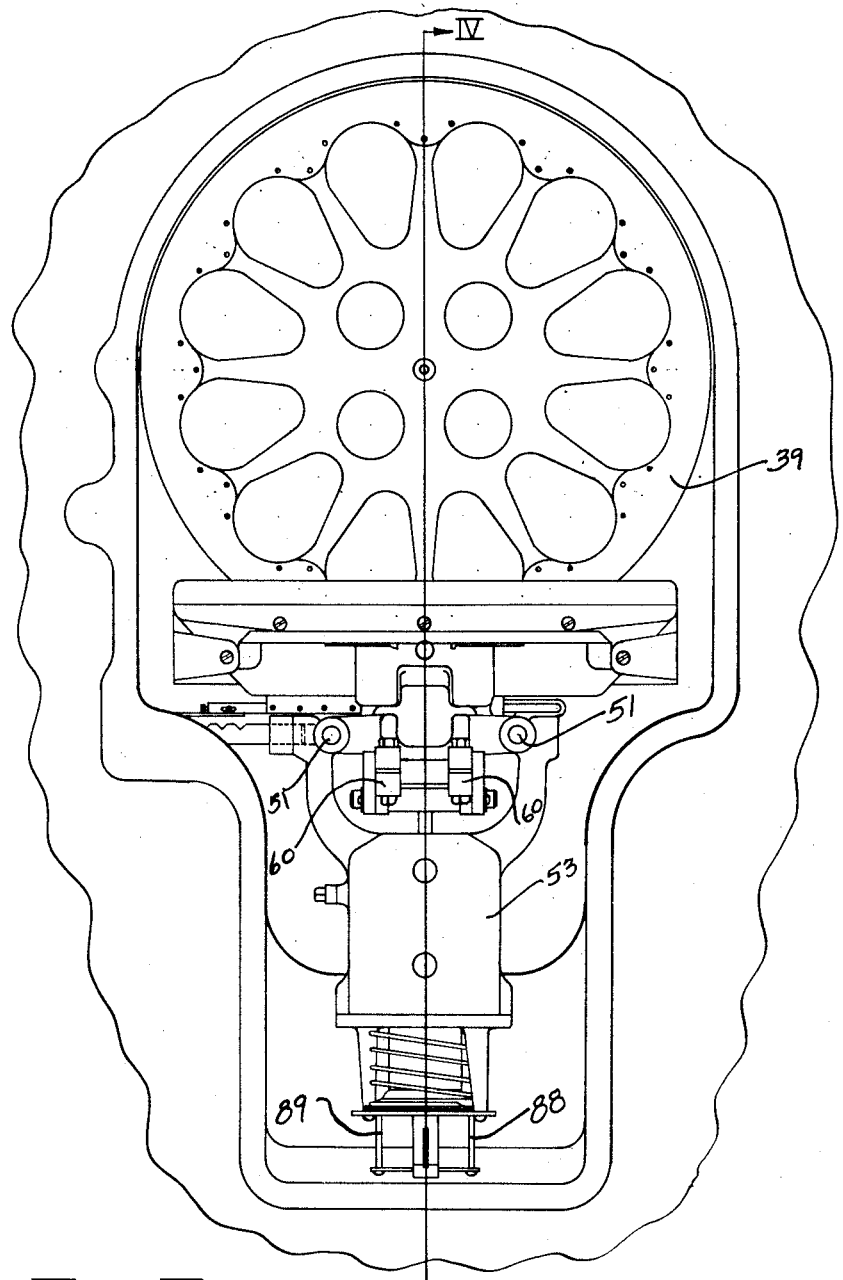

June 28, 1932.  L. S. WILLIAMS  1,864,570
TOTAL LOAD RECORDING SCALE
Filed April 22, 1930    5 Sheets-Sheet 4
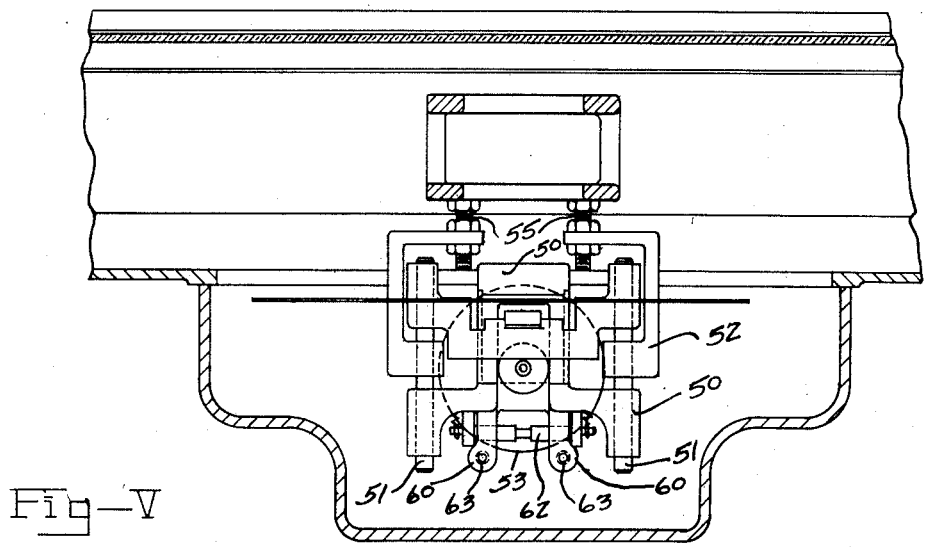
Fig-V
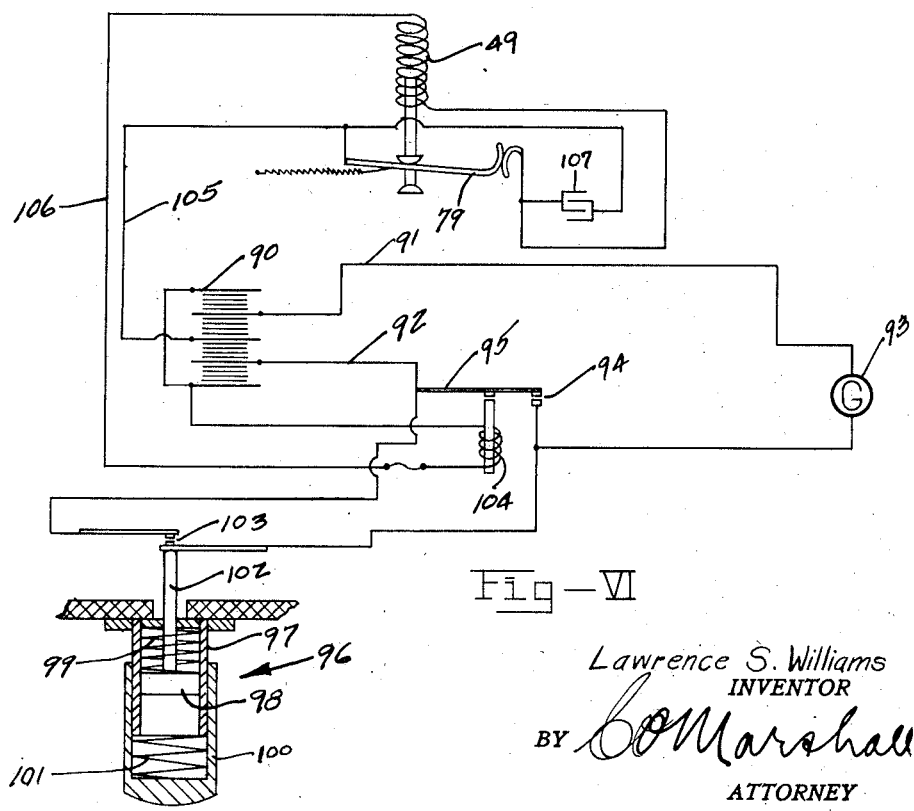
Fig-VI
Lawrence S. Williams
INVENTOR
BY  Marshall
ATTORNEY

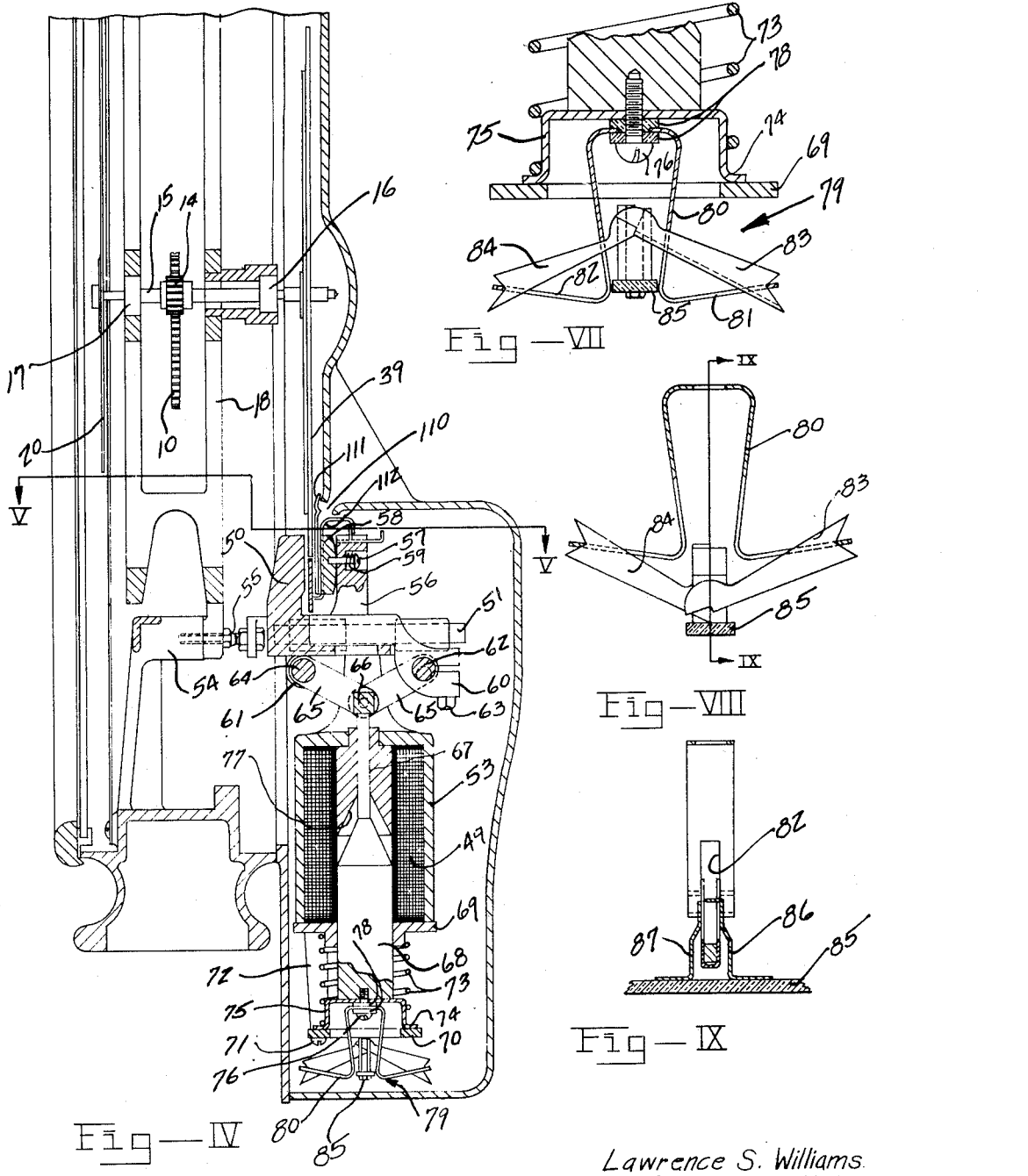

Patented June 28, 1932

1,864,570

UNITED STATES PATENT OFFICE

LAWRENCE S. WILLIAMS, OF TOLEDO, OHIO, ASSIGNOR TO TOLEDO SCALE MANUFACTURING COMPANY, OF TOLEDO, OHIO, A CORPORATION OF NEW JERSEY

TOTAL LOAD RECORDING SCALE

Application filed April 22, 1930, Serial No. 446,395, and in Canada September 24, 1930.

This invention relates to recording scales and in particular to recording scales which automatically print the weight of a commodity as determined by a scale, thus recording the weight on bills of lading, invoices, recepits or other papers. A scale of this type furnishes a memorandum of the weight, which may be given to the customer or patron. A carbon copy may constitute a check to be forwarded to the cashier or the clerical department, so mistakes in transcribing the weight are avoided and an accurate record is furnished to both parties to the transaction.

In weighing scales it is desirable that the indicating element have a great relative movement, the movement of the indicator often being several hundred times as great as the movement of the platform. Since the force available to move the indicator approaches zero as the indicator approaches the indicating position, it is evident that the slightest friction in the indicator bearing will cause the indicator to stop slightly out of the correct indicating position. In non-recording scales friction in the indicator is reduced to a minimum by making the indicator as light as possible and supporting it either on knife edges or on ball bearings of the most delicate character. In recording scales the type carrying wheel must not only have the same relatively large movement, but it must also be so designed that no undue strains are transmitted to the bearings during the printing operation. It must also be of such design that slight deformations caused by the continuous use do not effect the accuracy of the record. Scales which are equipped with unit weights to increase the weighing capacity must also be provided with means which permit the increase in the weighing capacity, effected by the unit weights, to be recorded without causing friction. The principal object of this invention is the provision of a recording scale having a very light type wheel and an adjustable index co-operating therewith.

A further object is the provision of an adjustable index adapted to indicate that increment of the total load, which is counterbalanced by the automatic weighing mechanism.

A further object is the provision of an adjustable index adapted to indicate increments of loads counterbalanced by the automatic weighing mechanism and by the unit weights.

A still further object is the provision of an adjustable index adapted to co-operate with indicating and printing means.

Other objects and advantages will be apparent from the following description in which reference is had to the accompanying drawings illustrating a preferred embodiment of the invention and wherein similar reference numerals designate similar parts throughout the several views.

In the drawings:—

Figure I is a front elevational view, parts of the cabinet being removed, of a scale embodying the invention.

Figure II is an enlarged fragmentary sectional view of the back of the scale.

Figure III is an enlarged rear elevational view, parts being broken away, of the printing and recording mechanism.

Figure IV is a fragmentary section of the printing and recording mechanism taken substantially along the line IV—IV of Figure III.

Figure V is a fragmentary plan sectional view taken substantially along the line V—V of Figure IV.

Figure VI is a wire diagram of the electrical circuit the switches being shown schematically.

Figure VII is an enlarged side elevation of the stroke switch in the dormant position.

Figure VIII is another fragmentary elevational view of the stroke switch, parts in section. This illustration shows the switch in the momentary "off" position.

Figure IX is a fragmentary section thereof taken substantially along the line IX—IX of Figure VIII, and Figure X is a fragmentary plan view of the "zero" adjustment of the co-operation index plate taken substantially along the line X—X of Figure II.

Referring to the drawings in detail, a base (not shown) suitably houses a load supporting lever system on which a platform is mounted in the usual manner for the reception of loads. A rod 1 by means of the stirrup 2 is pivotally connected to the nose of the load lever system. The upper end of the rod 1 pivotally engages, with the aid of a stirrup 3, a lever 4 which is suitably supported upon fulcrum bracket 5, which is stationed on a shelf 6 within the cabinet 7. A rod 8, which co-operates with suitable intermediate members, pivotally connects the lever 4 to the pendulum load counterbalancing mechanism 9. These pendulums offset a portion of a load placed on the platform. They are adapted to swing outwardly and upwardly to an angular distance proportional to the weight of the load. The teeth of a rack 10, which is secured to a moving part 11 attached to the pendulums 12 and 13, engage the teeth of a pinion 14 which surrounds and is fastened to the shaft 15. The shaft is mounted in anti-friction ball bearings 16 and 17 which are fixed in a stationary frame 18 located within a substantially watch-case-shaped housing 19, surmounting the cabinet 7. The load counterbalancing pendulum mechanism 9 is suspended from the frame 18 by suitable flexible metallic ribbons.

When a load is placed on the platform and it is counterbalanced by the pendulum load counterbalancing mechanism 9, the indicator 20, fastened to the shaft 15, is rotated by the co-operation of the rack 10 and the pinion 14, through an angle which is proportional to the weight of the load. The indicator thus points to the proper weight character 21 which is printed or otherwise suitably marked on the chart 22, fastened within and to the housing 19. When it is desired to weigh loads which are greater than the capacity of the automatic counterbalancing mechanism 9, a manually operated unit weight load counterbalancing system is provided. This unit weight counterbalancing system comprises a rod 23 which is suspended by means of a stirrup 24 from the pivot 25 extending laterally from the lever 4. A combined loading box and weight rest 26, secured to the lower end of the rod 23, serves as a rest for the unit weight 27. Unit weights 27, 28, 29 and 30 are designed to rest upon each other when lowered by suitable mechanism attached to the handle 31. A segment 32, provided with indentations 33 permits the desired number of unit weights to be placed on the weight rest 26. To prevent swinging motion of the weight rest 26 and unit weights resting thereon, a check link 34 is provided. An upwardly extending rod 35 which is operatively connected to the manipulating lever 31 co-operates with a flash 36, fulcrumed at one end to a stationary part of the housing 19, and whose other enlarged end is provided with a series of indicia 37, representing the weights of the increments of load counterbalanced by the manipulative unit weight counterbalancing mechanism. The correct amount thus counterbalanced is exposed to the operator's view in the aperture 38, in the chart 22.

The scale thus far described is a weighing scale of which large numbers are in use and which is manufactured in large quantities by efficient manufacturing processes, resulting in a comparatively low selling price to the purchaser. Printing and recording scales, however, heretofore have been sold at comparatively high prices, owing to the fact that scales of that type were so different from the ordinary weighing scale, and partly for that reason did not enjoy a large sale. Manufacturing and selling costs are dependent, to a great extent, on manufacturing conditions. One of the objects of this invention is the provision of means whereby a scale of the type described having automatic load counterbalancing mechanism and manipulative unit weight counterbalancing mechanism may be converted into a printing scale which is adapted to make a permanent record of the total mechanisms.

The shaft 15 to which the indicator 20 is fastened has secured to its opposite end a type wheel 39. This type wheel 39 is made of thin light metal and has graduations and figures etched in relief on one of its faces. These figures and graduations corresponding to the figures and graduations 21 marked on the chart 22 and represent the weights of loads. An index plate 40 is stationed directly beneath the type wheel 39. This index plate 40 is fastened to a member 41 in a manner so that it may be accurately aligned in the plane of the type wheel 39. The member 41 to which the index plate 40 is fastened is slidably mounted on a guide bracket 42 which is secured within the housing 19, and is pivotally fastened to one end of the connecting member 43, whose other end is pivotally joined to an extending arm 44, fastened to the flash 36. A member 41, provided with a spring pressed plunger 45 co-operates with a series of detents in the brackets 42 which are in spaced relation to each other and to a vertical line through the center of revolution of the type wheel. The index plate bears indicia 46, 46a, 46b, 46c and 46d in relief, and these raised characters face in the same direction as the characters on the type wheel. The indicia 46, 46a, 46b, 46c and 46d represent the increments of the load counterbalanced by the unit weight counterbalancing mechanism and are adapted to be printed on the same record on which the weight of the increment of the load counterbalanced by the automatic pendulum load counterbalancing mechanism is recorded, so that the total weight of the load on the platform is printed on the ticket or other record. To permit the character 46 to be accurately positioned with reference to an imaginary vertical line through the center of rotation of the type wheel or disc; the plate 40 is loosely clamped to an upwardly projecting flange 40a of the bracket 40b by the screw 40c projecting through an elongated slot (see Figure X). The bracket 40b is adjustably fastened to the member 41 by the screws 40d and has a further upwardly projecting flange 40e through which an adjusting screw 40f is threaded which snugly extends through an opening in the bent over portion 40g of the plate 40. A spring 40h surrounding the body of the adjusting screw 40f and contacting the flange 40e and the portion 40g of plate 40 constantly urges it in one direction, and serves to hold it invariably after it has been adjusted by the screw 40f.

When loads within the capacity of the automatic pendulum load counterbalancing mechanism are weighed, the unit weights 27, 28, 29 and 30 are suspended from supports within the cabinet 7 and do not influence the weighing mechanism, and the flash 36 indicates this condition to the operator by displaying a "zero" character in the opening 38. When a load greater than the automatic weighing capacity is placed on the load receiver, the pendulums 12 and 13 move outwardly until they rest against bumpers (not shown) which are suitably located in the housing 19. The indicator 20, actuated by the rack 10 attached to the member 11, which connects the two pendulums, traverses the entire chart and stops within the free space on the chart 22 between the zero and full capacity character. This is an indication to the operator that the load is greater than the automatic weighing capacity and that the manipulative counterbalancing mechanism must be employed. Accordingly, the operator moves the handle 31 so that a plunger 48 enters the next detent in the segment 32. This lowers the unit weight 27 until it rests on the weight rest 26, and the flash 36 being directly connected to the operating level 31 is shifted so that the characters, "1,000 lbs.", in this example, appear in the opening 38. These characters, "1,000 lbs.", represent the amount of load counterbalanced by the manipulative load counterbalancing mechanism. The arm 44 which is also fastened to the flash 36 partakes corresponding motion and the plate 40 and the member 41 is shifted laterally until the spring pressed plunger 45 engages the proper detent so that the characters 46a on the index plate 40 are stationed in the printing position.

It will be seen that when more unit weights are dropped on the weight rest 26, the proper indicia are exposed in the opening 38 and the proper index and characters on the index plate 40 are brought into the printing position.

The printing mechanism consists of an abutment 50 which is slidably mounted on track or guide members 51. These guide members are securely attached to brackets 52 which form integral parts of the solenoid housing 53 and are securely fastened to a part 54 of the housing 19 by the retaining studs 55. The track or guide members 51 also support and guide a platen frame 56. This also is freely movable on the track members. Set into a recess of the platen frame 56 and retained by a screw 57 is a platen 58. The back of this platen is made slightly spherical where it rests against the platen frame so that its face may align itself to another surface. A spring 59 is interposed between the platen frame 56 and the underside of the head of the screw 57 urging it outwardly and thus firmly holding the alignable platen 58 in its proper position. Depending from the abutment 50 and the platen frame 56 are four short projections or arms 60 and 61 respectively. The two arms 60 which form an integral part of the abutment 50 are provided with apertures in which a shaft 62 is eccentrically mounted and locked in position by the clamp screws 63. The two short arms 61 similarly support a shaft 64. The shafts 62 and 64 respectively are connected by means of toggle links 65 to a horizontal connecting shaft 66, to which is fastened an extension 67 of a solenoid core 68 which has a reciprocating motion within a solenoid coil 49, located within the solenoid housing 53. The coil 49 is retained within the housing 53 by a cover plate 69 which is secured to the solenoid housing 53 by means of screws (not shown). An annular solenoid core stop plate 70 is secured by means of the screws 71 to two depending studs 72. These two studs 72 are integral with the cover plate 69. A spring 73 surrounds the core 68 and presses upwardly against the cover plate 69 and downwardly against a flange 74 of a cuplike member 75 which is secured to the lower end of the core 68 by the screw 76. The spring 73 constantly urges the core 68 into its lower position against the stop plate 70. The upward motion of the core is limited by the core stop 77. Attached to the core 68 by the screw 76 and insulated therefrom by the dielectric washers 78 is an over center stroke switch 79. This stroke switch 79 comprises a flexible frame 80 provided with laterally extending wing portions. The frame 80 is provided with slots 81 and 82 in which the switch members 83 and 84 are retained respectively. The contact members 86 and 87 are secured to a stationary part comprising a dielectric plate 85. This plate 85 with the contact members 86 and 87 is located beneath the core stop plate 70 and spaced therefrom by the studs 88 and 89. When the scale is operated, the stroke switch will assume successively the positions shown by Figures VII, VIII and IX. Figure VI is a wiring diagram of the electric circuit, the parts shown therein are represented diagrammatically only, and it is to be understood that any suitable part may be used in this connection. Solenoid coils which operate on direct current are much simpler to build and more dependable, for this reason a rectifier 90 is provided to convert the alternating current to direct current. The wires 91 and 92 are in series with the source 93 of the alternating current. The wire 92 is broken by a normally open contact 94 controlled by a relay switch 95.

A transitory switch 96 is in parallel with the relay switch 95. This transitory switch 96 comprises a cylindrical hollow body 97 which is secured to a stationary part of the device. The interior of this body is accurately ground or reamed and a piston-like member 98 is stationed for reciprocal movement. A spring 99 pressing against the bottom of the cylindrical member 97 and against the piston 98 urges it into a predetermined position. The cylindrical member 100 surrounds the member 97 and is provided with means (not shown) which allow a limited reciprocal motion. The exterior end of the member 100 serves as a push button. When pressure is applied in opposition to the spring 101 the air between the head of the piston 98 and the interior head of the member 100 is slightly compressed, forcing the piston 98 with the thereto attached plunger stem 102 forward, closing the contact 103 momentarily. The transitory switch 96 is so made that the pressure of the air column dissipates immediately, allowing the spring 99 to return the piston 98 into its original position.

Closing the contact 103 closes the alternating current circuit. The rectifier 90 is now energized and feeds direct current to the relay electromagnet 104. The flux set up therein keeps the contact 94 closed until the contact of the stroke switch 79, attached to the solenoid core 68 which operates within the main solenoid coil 49, is broken. The solenoid coil is fed direct current by the wires 105 and 106. A condenser 107 is provided to prevent excessive sparking at the contacting points of the switch 79. When the contact of the stroke switch 79 is broken, the supply of direct current ceases instantly. This de-energizes the relay electro-magnet 104 which permits the contact 94 of the relay switch 95 to open. This cycle has a duration of only a fraction of a second.

It will be seen that when the push button member 100 is pressed, the reaction of the air against the piston 98 is only momentary and due to the construction of the switch, a repetition is obviated unless the push button is again pressed. The core 68 urged by the spring 73 returns to its bottom position carrying the stroke switch 79 with it, again closing its contacts, thus resuming a position so that the cycle may be instantly repeated.

Assuming that a load weighing 2700 lbs. is to be weighed and the weight recorded; when this load is placed on the platform it is partially counterbalanced by the upwardly and outwardly swinging pendulums 12 and 13 located within the housing 19, but as the load is greater than the automatic capacity, the pendulums 12 and 13 will swing slightly beyond the full movement for the capacity of the automatic counterbalancing mechanism and the indicator will come to rest beyond the full capacity character on the chart 22 which in this case is 1000 lbs. The operator next, by means of the interposed mechanism, drops the unit weight 27 on the unit weight rest 26 which is suspended from the lever mechanism. The counterbalancing capacity of this unit weight is 1,000 lbs. or equal to the capacity of the chart. As the load, however, is greater than 2000 lbs. the indicating hand will remain within the free space on the chart 22 and the unit weight 28 must be lowered in a similar manner increasing the capacity to 3000 lbs. As the load on the platform is only 2700, 2000 lbs. being counterbalanced by the manipulative counterbalancing mechanism and the 700 lbs. which are counterbalanced by the automatic pendulum load counterbalancing mechanism will cause the indicating hand, which is driven by the pendulum mechanism to indicate this amount on the chart. The amount counterbalanced by the movable load counterbalancing mechanism is indicated by the flash 36 in the opening 38 of the chart 22. When the unit weight 27 was dropped on the weight rest 26, the flash actuated by the intermediate mechanism exposed the figure "1000". When the second unit weight was lowered on to the weighing mechanism the figure "2000" was shown. By adding the amount indicated by the indicator 20 to the figure shown by the flash, the total amount of the load counterbalanced is obtained. The index plate 40 performs a similar function for the printing mechanism inasmuch as with the addition of each unit weight it is automatically shifted as it is also actuated by means of the intermediate mechanism and by the handle 31, and in the preceding example, the characters 46b will be positioned so that when the printing mechanism is actuated as has been hereinbefore described, the "2000" character on the index plate 40 will be printed in conjunction with the "700" character on the type wheel 39. As the type wheel is attached to the same shaft to which the indicator 20 is fastened, it is rotated through the same angular movement as the indicator.

Special forms of bills of lading receipts or other documents are required by this invention. As it is customary to retain a copy of these documents, these special forms consist of an original which may be printed on paper of ordinary thickness, a copy sheet of thin translucent material and a sheet of double faced carbon paper interposed between the other two sheets. When the scale, after placing the load on the platform, has come to rest, this form of bill of lading or other document just described is inserted to the slot 110 (see Figure IV) and is guided into the proper position in front of the type wheel 39 and index plate 40 by the guide members 111 and 112. Pressure on the push button 100 causes, as has previously been described, the coil 49 to be energized. The core 68 moves upwardly and causes, by means of the core extension 67 and the shaft 66, the toggle links 65 secured thereto to assume a substantially horizontal position, forcing the abutment 50 and the alignable platen 58 towards each other. As the type wheel 39 and the index plate 40 are located between the abutment 50 and the platen 58, the aforementioned bill of lading or other document, previously inserted in the slot 110 and now positioned in front of the type wheel and index, is pressed against the face of the type on the latter and on the index, thus recording simultaneously the weight of the increments of the load which are counterbalanced by the manipulative load counterbalancing mechanism and by the automatic load pendulum counterbalancing mechanism.

The shaft 62 held in the arms 60 which form a part of the abutment 50 has its ends machined eccentrically to its axis, so that when it is slightly rotated, the proper amount of clearance between the abutment of the platen at the instant of printing is obtained. The total weight of the load is printed correctly on the original of the aforementioned document. On the copy, the graduations and numerals appear on the back and are therefore in a reversed position, however, as the material is translucent they may be read from the front where they appear correctly positioned.

It is obvious that the structure herein described is well suited to fulfill the objects hereinbefore stated. It is to be understood, however, that the invention is susceptible to variation, modification and change within the spirit and scope of the subjoined claims.

Having described my invention, I claim:

1. In a scale of the type described, in combination, weighing mechanism comprising automatic load counterbalancing and load counterbalancing means, recording mechanism operating in conjunction with said weighing mechanism, said recording mechanism including a member of thin flexible material bearing graduations and numerals.

2. In a scale of the type described, in combination, weighing mechanism comprising automatic load counterbalancing and load counterbalancing means, recording mechanism operating in conjunction with said weighing mechanism, said recording mechanism including a vertically disposed flat member of thin flexible material bearing weight graduations and numerals.

3. In a scale of the type described, in combination, weighing mechanism comprising pendulum load counterbalancing and manipulative load counterbalancing means, recording mechanism operating in conjunction with said weighing mechanism, said recording mechanism including a vertically disposed disk of thin flexible metal bearing raised graduations and numerals.

4. In a scale of the type described, in combination, weighing mechanism, comprising automatic load counterbalancing and manipulative load counterbalancing means, indicating mechanism operated by said weighing mechanism and recording mechanism operating in conjunction therewith, said indicating mechanism including a movable chart and indicator, said recording mechanism including a vertically disposed disk of light thin material having graduations and numerals disposed on one of its faces.

5. In a scale of the type described, in combination, weighing mechanism comprising pendulum load counterbalancing and manipulative unit weight load offsetting means, indicating mechanism operated by said weighing mechanism, recording mechanism operating in conjunction therewith, said indicating mechanism including a relatively movable chart and indicator, said recording mechanism including a vertically disposed disk of light thin material having weight graduations and numerals disposed on one of its faces, said graduations and numerals being raised from said face of said disk.

6. In a scale of the type described, in combination, weighing mechanism comprising pendulum load offsetting and manipulative unit weight offsetting means, indicating mechanism operated by said weighing mechanism including a relatively movable chart and indicator, recording mechanism operating in conjunction therewith, said recording mechanism including a vertically disposed disk of thin flexible material having weight graduations and numerals disposed on one of its faces, secured to said indicating mechanism and a plate bearing an index mounted in the plane of the vertically disposed disk and co-operating therewith to record weights of loads.

7. In a scale of the type described, in combination, weighing mechanism comprising pendulum load offsetting and manipulative unit weight load offsetting means, indicating mechanism operated by said weighing mechanism including a relatively movable chart and indicator, recording mechanism operating in conjunction therewith, said recording mechanism including a vertically disposed disk of thin flexible material having weight graduations and numerals disposed on one of its faces, secured to said indicating mechanism and a plate bearing a plurality of indexes mounted in the plane of the vertically disposed disk and co-operating therewith to record weights of loads.

8. In a scale of the type described, in combination, weighing mechanism comprising pendulum load offsetting and manipulative capacity increasing mechanism, indicating mechanism operated by said pendulum load offsetting means and recording mechanism operating in conjunction with said weighing mechanisms, said recording mechanism including a disk of thin metal having indicia on one of its faces, said disk being actuated by said pendulum offsetting means and said indicating mechanism, means for backing a portion of said disk in a direction at right angles to its axis and means for pressing sheets of paper against the indicia directly in front of said backed portion.

9. In a scale of the type described, in combination, weighing mechanism comprising pendulum load offsetting and manipulative capacity increasing unit weight mechanism, indicating mechanism actuated by said pendulum load offsetting means, recording mechanism operating in conjunction therewith, said recording mechanism including a rotating type disk of light thin flexible metal co-operating with a movable plate bearing a plurality of indexes and indicia representing weight of loads counter-balanced by said unit weight manipulative load offsetting means, mounted in the plane of said rotating disk, means for pressing a portion of said disk and of said plate in a direction parallel to the axis of rotation of said disk and means for pressing sheets of paper against the opposite side of said portions.

10. In a recording scale, in combination, weight offsetting and indicating mechanisms and recording mechanism operating in conjunction therewith, said recording mechanism including a rotatable type bearing disk of thin light flexible material and a movable plate of similar materal bearing indicia mounted in the plane of rotation of the type bearing disk and adapted to be moved into different positions by said weighing mechanism.

11. In a recording scale, in combination, weight offsetting and indicating mechanism and recording mechanism operating in conjunction therewith, said recording mechanism including a rotatable type bearing disk of this light flexible material and a movable plate of similar material bearing indicia mounted in the plane of rotation of the type bearing disk and adapted to be moved into different positions by said weighing mechanism and a slidably mounted abutment, a slidably mounted platen frame and means for causing said sliding members to press on the opposite sides of said type and index bearing members.

12. In a recording scale, in combination, weighing mechanism comprising pendulum load offsetting and manipulative load offsetting means indicating mechanisms operated by said load offsetting means, recording mechanism operating in conjunction with said weighing mechanisms including a rotatable flat circular disk of thin flexible metal bearing indicia and a plate of similar material bearing a plurality of index characters and a plurality of weight designating numerals adjustably mounted in the plane of rotation of said indicia bearing disk, a slidably mounted abutment and a slidably mounted platen frame with a self aligning platen and electrically operated means for causing said members to press on the opposite sides of said indicia bearing members, said electrically operated means including a solenoid coil, a solenoid core having an extension and toggle links pivotally connected to said extension and said sliding members.

13. In a recording scale, in combination, automatic load offsetting and manipulative load offsetting means, indicating mechanisms actuated by said weight offsetting means, recording mechanism operating in conjunction therewith, said recording mechanism including a rotatable flat circular disk of thin flexible metal bearing indicia and a movable plate of similar material bearing a plurality of index characters mounted in the plane of revolution of said indicia bearing disk, a slidably mounted abutment and a slidably mounted platen frame with a self aligning platen and electrically operated means for causing said members to press on the opposite sides of said indicia bearing members, said electrically operated means including a solenoid coil, a solenoid core and toggle links pivotally connecting said core and said sliding members, said solenoid core being spring urged into one position.

14. In a recording scale, in combination, weight offsetting mechanisms and indicating mechanisms and recording mechanism operating in conjunction with said weight offsetting mechanisms, said recording mechanism including a rotatable flat circular disk of thin flexible metal bearing indicia and an adjustable plate of similar material bearing a plurality of index characters mounted in the plane of rotation of said indicia bearing disk, a slidably mounted abutment and a slidably mounted platen frame with self aligning platen and electrically operated means for causing said members to press on opposite sides of said indicia bearing members, said electrically operated means including a solenoid coil, a solenoid core having an extension and toggle links pivotally connected to said extension and said sliding members, said solenoid core being spring urged into one position and having a stroke of predetermined length and means for interrupting the electrical current at the end of said stroke.

15. In a recording scale, in combination, a plurality of weight offsetting means and recording means operating in conjunction therewith, said recording means having a disk of thin light metal bearing raised weight graduations and numerals, an adjustable plate bearing a plurality of raised index characters and numerals, electrically energized means for obtaining an impression of a portion of said graduations and numerals on paper and a transitory switch for initiating the flow of the electrical energizing current.

16. In a recording scale, in combination, weight offsetting mechanisms indicating mechanisms actuated by said offsetting mechanisms and recording mechanism operating in conjunction therewith, said recording means having a disk of thin light metal bearing raised weight graduations and numerals and co-operating with an adjustable plate also bearing raised characters adapted to be set by one of the offsetting mechanisms in proper position and electrically energized means for obtaining an impression of a portion of said graduations and numerals on paper and a transitory switch initiating the flow of the electrical energized current, said transitory switch having a contact duration of predetermined length.

17. In a recording scale, in combination, weighing mechanism comprising pendulum load offsetting and manipulative capacity increasing means, a plurality of indicating means actuated by said weighing mechanism comprising a relatively movable chart and indicator for indicating the amount of load offset by said pendulum load offsetting means and a movable indicator bearing weight graduations for indicating the amount of load offset by said manipulative capacity increasing means, recording means co-operating with both of said load offsetting means including a disk of thin light flexible metal bearing indicia representing the amount of load offset by said pendulum load offsetting means and a movable plate of similar material bearing index and weight characters representing the amount of load counterbalanced by said manipulative capacity increasing means mounted in the plane of said thin metallic disk, and electrically energized means for obtaining an impression of said graduations and indicia on paper, said electrical means including a transitory current flow initiating switch and a switch operated by a moving member to interrupt the flow of the electrical energizing current.

18. In a recording scale of the type described, weighing mechanism comprising a plurality of weight offsetting means, means for recording the weights of loads counterbalanced by said load offsetting means on records, said recording means including a disk of light flexible metal bearing indicia for recording the amount of loads offset by one of said plurality of load offsetting means and a movable index plate bearing a plurality of weight characters representing the amount of weight offset by another of said plurality of said offsetting means, said records consisting of two sheets of paper with a double faced carbon paper interposed between said sheets and is adapted to receive an impression of said indicia.

19. In a recording scale of the type described, weighing mechanism comprising a plurality of weight offsetting means, means for recording the weights of loads counterbalanced by both of said load offsetting means on records, said recording means including a disk of light flexible metal bearing indicia for recording the amount of loads offset by one of said plurality of load offsetting means and a movable index plate bearing a plurality of weight characters representing the amount of weight offset by the other of said plurality of said offsetting means, said records consisting of two sheets of paper with a double faced carbon paper interposed between said sheets and is adapted to receive an impression of said indicia, one of said sheets being thin and translucent adapted to have an impression on its back read from the front.

20. In a recording scale of the type described, in combination, load receiving means and a plurality of weight offsetting means comprising automatic pendulum load counterbalancing and manipulative unit weight load offsetting means, means for operatively connecting said load receiver and said plurality of offsetting means, means for indicating the amounts of load offset respectively by said pendulum load offsetting mechanism and said manipulative unit offsetting mechanism, and recording means comprising a relatively movable indicia bearing disk operated by one of said indicating mechanisms and a stationary plate of similar material mounted adjustably in the plane of said indicia bearing disk and co-operating with said indicia bearing disk to record the total amount of load offset by said plurality of load offsetting means.

LAWRENCE S. WILLIAMS.